United States Patent [19]
Kotzin

[11] Patent Number: 6,157,669
[45] Date of Patent: Dec. 5, 2000

[54] METHOD AND APPARATUS FOR PREEMPTING BURST FREQUENCY ASSIGNMENTS IN A FREQUENCY-HOPPING COMMUNICATION SYSTEM

[75] Inventor: Michael D. Kotzin, Buffalo Grove, Ill.

[73] Assignee: Motorola, Inc., Schaumburg, Ill.

[21] Appl. No.: 08/321,382

[22] Filed: Oct. 11, 1994

Related U.S. Application Data

[63] Continuation of application No. 07/970,731, Nov. 2, 1992, abandoned.

[51] Int. Cl.[7] .................................................. H04L 27/30
[52] U.S. Cl. ........................ 375/132; 375/136; 375/137; 370/347
[58] Field of Search .................................. 370/330–332, 370/344, 480, 343, 319, 321, 322, 337, 435, 442, 345, 347; 375/132–137; 455/452

[56] References Cited

U.S. PATENT DOCUMENTS

| | | | |
|---|---|---|---|
| 3,806,804 | 4/1974 | Mills et al. .............................. | 455/34.1 |
| 4,425,639 | 1/1984 | Acampora et al. ...................... | 370/323 |
| 4,554,668 | 11/1985 | Deman et al. ................................ | 375/1 |
| 4,937,822 | 6/1990 | Weddle et al. ......................... | 370/50 X |
| 5,038,399 | 8/1991 | Bruckert ................................... | 455/447 |
| 5,079,768 | 1/1992 | Flammer ................................. | 370/94.1 |
| 5,081,641 | 1/1992 | Kotzin et al. ................................ | 375/1 |
| 5,115,463 | 5/1992 | Moldavsky et al. ..................... | 455/465 |
| 5,193,101 | 3/1993 | McDonald et al. .......................... | 375/1 |
| 5,257,398 | 10/1993 | Schaeffer ................................ | 455/452 |
| 5,291,475 | 3/1994 | Bruckert ................................... | 370/330 |
| 5,299,198 | 3/1994 | Kay et al. ................................. | 370/347 |

FOREIGN PATENT DOCUMENTS

104206B1  10/1986  European Pat. Off. .

*Primary Examiner*—Stephen Chin
*Assistant Examiner*—Shuwang Liu
*Attorney, Agent, or Firm*—L. Bruce Terry; Richard A. Sonnentag

[57] ABSTRACT

A frequency-hopping communication system preempts certain burst frequency assignments. The communication system is capable of communicating to mobile stations (114, 115) via a radio channel (121) in a TDM/TDMA mode. A plurality of mobile stations are assigned burst frequencies for transmission during timeslots of the TDMA system. To support additional mobile stations without additional burst frequencies, the communication system preempts the burst frequency assignment from the plurality of mobile stations, and utilizes the preempted assignment to support communication to the additional mobile stations.

3 Claims, 2 Drawing Sheets

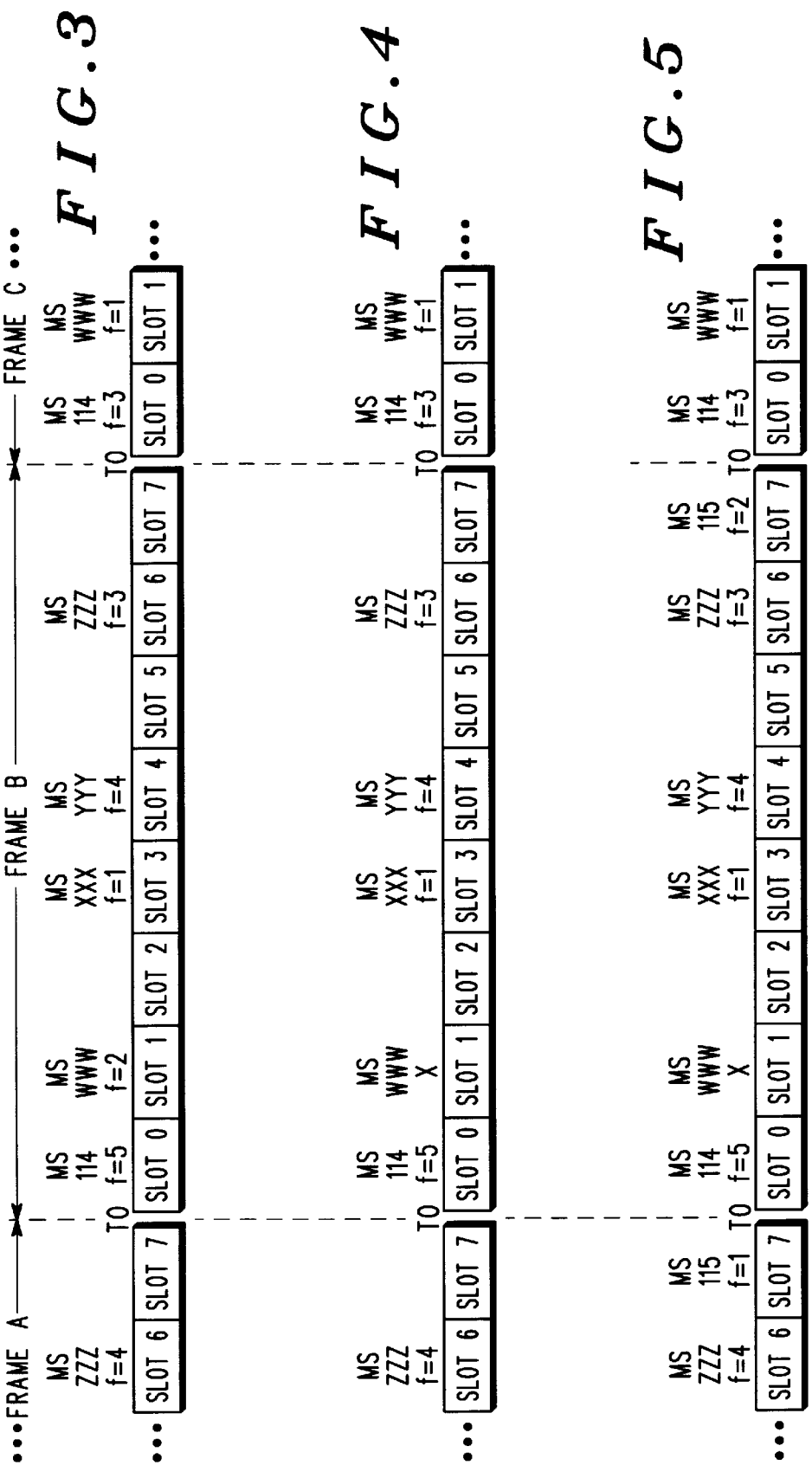

METHOD AND APPARATUS FOR PREEMPTING BURST FREQUENCY ASSIGNMENTS IN A FREQUENCY-HOPPING COMMUNICATION SYSTEM

This is a continuation of application Ser. No. 07/970,731, filed Nov. 2, 1992 and now abandoned.

FIELD OF THE INVENTION

This invention relates generally to communication systems and more specifically to frequency hopping, digital cellular radiotelephone systems.

BACKGROUND OF THE INVENTION

Cellular communication systems are known. Such systems are, typically, comprised of a number of cells, each having a service coverage area, and a number of cellular telephones (mobile stations, MS). The service coverage areas of adjacent cells may be arranged to partially overlap in such a manner as to provide a substantially continuous coverage area in which a mobile station receiving service from one cell may be handed off to an adjacent cell with no interruption in service. The Groupe Special Mobile (GSM) Pan-European digital cellular system, as specified in GSM recommendations available from the European Telecommunications Standards Institute (ETSI), is an example of just such a system.

A cell's radio coverage is provided by a base-station (BS). Each BS contains one or more transceivers (TRX) which can simultaneously receive on one frequency and transmit on another. Communication between a BS and a MS typically occurs using a portion of a pair of frequencies (transmit and receive) temporarily assigned in support of the communication transaction at the BS.

The pair of frequencies assigned for use at the remote site are typically referred to as a radio channel. Downlink transmissions from a BS to a MS on the radio channel occur on a first frequency of the pair of frequencies. Uplink transmissions from an MS to a BS on the radio channel occurs on the second frequency of the pair of frequencies.

The GSM system is a TDM/TDMA system providing eight full duplex signal paths (8 TDM slots per TDM frame) on each radio channel. A single, primary radio channel allocated to a BS, by virtue of its being time multiplexed, can support up to seven full rate duplex traffic (speech or data) users in addition to a multiplexed common control channel within the eight TDM slots. Additional, secondary radio channels assigned to the same cell can provide a full complement of eight full rate traffic users (in the 8 TDM slots) per radio channel, since the control channel within the primary radio channel can control allocation of communication resources on secondary radio channels.

Transmissions (control, speech, and/or data traffic) from a BS to a MS occupy a first TDM slot (i.e., downlink slot) on a first frequency of a radio channel and transmissions from a MS to a BS occupy a second TDM slot (i.e., uplink slot) on the second frequency of the radio channel. The MS's uplink slot on the second frequency is displaced in time three TDM slot positions following the downlink slot on the first frequency. The MS's uplink slot on the second frequency is offset 45 MHz lower in frequency than the downlink.

Due to the aberrations caused by the mobile radio channel, various means have been employed to improve the transmission of speech signals over the radio. For one, redundancy is provided to the encoded speech information by the use of error correction coding techniques. This includes block and convolutional coding techniques.

Another improvement that has been utilized in GSM is the use of interleaving of the information and slow frequency hopping. In frequency hopping, the coded information is transmitted in sequential bursts on a multiplicity of radio frequencies. Frequency hopping systems are well known. Depending on the method of frequency hopping employed within a cell and amongst other cells, various degrees of immunity to fading and interference can be obtained. For example, the frequency hopping provides some frequency diversity in the radio channel. That is, it reduces the likelihood that the signal remains faded for an unnecessarily long period of time. If only some of the information is lost by being transmitted on frequencies that are experiencing fading, the error correction decoding still allows the information to be reproduced.

Frequency hopping can also provide a degree of robustness to interference from other users in adjacent cells. With simple frequency division multiplex, a cochannel interferer might be present that could continuously interfere with a particular mobile station. Employing uncorrelated frequency hopping sequences for the two mobile stations reduces that potential interference to only when collisions occur. This can be made relatively infrequent. Error correction coding allows information recovery even with the existence of the collisions.

With regard to the usage of frequencies within a given cell by the set of frequency hopping mobile stations, there are generally two frequency hopping assignment strategies which dictate how the selection of frequencies occurs. A first strategy is "random hopping." With "random hopping" each user has his own personal frequency sequence. The frequency sequence used to serve a particular mobile station within a cell is uncorrelated with the sequence of frequencies used to serve any other particular mobile station. Thus, there is a finite probability that a collision (two mobile stations simultaneously using the same frequency) will occur. Generally, this greatly limits the number of sequences that can be simultaneously used in a given cell.

A second frequency hopping assignment strategy is termed "orthogonal hopping", which is implemented in GSM. With "orthogonal hopping", the frequency sequences for the mobile stations served by a given cell are deterministically selected such that no user is utilizing the same frequency at the same instant of time. In this manner, there is no possibility for a collision between two mobile stations to occur. A significant performance improvement is realized as compared with non-hopped operation both from multipath (fading) mitigation and inter-cell co-channel interference.

A significant limitation with orthogonal hopping is that there is a limit to the instantaneous number of mobile stations that can be accommodated by a cell. Namely, the maximum number of mobile stations that can be served is equal to the available number of frequencies assigned for use in the cell that the mobile stations can hop over. This limitation is generally established by the limit in overall spectrum available, the reuse distance, and the reuse pattern. Further, because of the dynamics of a cellular radio system, it is generally undesirable to completely assign all the available hopping sequences within a cell. This is because there must be some sequences left as a buffer to accommodate mobile stations that make new call requests or hand over to the cell from an adjacent cell. The grade of service, or probability of blocking a mobile station from a cell, dictates how heavily the frequencies at a cell can be used. In essence, capacity must be held in reserve to meet certain peaks in demand which arise from time to time. For a fixed frequency allocation and desired grade of service, this has the effect of reducing the ultimate capacity.

Accordingly, there exists need to allow an increase in the mobile station capacity in a frequency hopping system that can be served with a fixed number of frequencies without greatly decreasing the performance, grade of service, nor increasing the complexity of the system.

SUMMARY OF THE INVENTION

A base-station in a communication system communicates with a first mobile station out of a plurality of mobile stations via burst frequencies. The base-station comprises means for assigning the burst frequencies to support communication between the base-station and the first mobile station and means, which is coupled to the means for assigning, for preempting certain of the burst frequency assignments between the base-station and the first mobile station to support communication between the base-station and a second mobile station.

BRIEF DESCRIPTION OF THE DRAWINGS

FIG. 3 generally depicts burst frequency assignment for 5 mobile stations (MSs) utilizing 5 burst frequencies.

FIG. 4 generally depicts the burst frequency assignment of FIG. 3 having a burst frequency assignment preempted in accordance with the invention.

FIG. 5 generally depicts burst frequency assignment for 6 mobile stations utilizing 5 burst frequencies in accordance with the invention.

DETAILED DESCRIPTION OF A PREFERRED EMBODIMENT

In a frequency-hopping digital cellular system, a means is described to provide additional mobile station capacity without significantly degrading overall system performance. The means involves assigning burst frequencies in sequences to support communication between a base-station (BS) and mobile stations (MS) such that the number of hopping sequences provided is greater than the total number of frequency channels available. The means involves first providing a primary set of orthogonal frequency sequences. Additional MS's are accommodated by overlaying additional secondary frequency sequences which controllably "steal", or "preempt", frequencies from the BS. This "preemption" is effected in a manner that ensures that the impact on any particular user is minimized. The secondary sequences can likewise be orthogonal with each other. Receivers of the hopped sequences may be aware (perhaps by decoding marker information communicated to a mobile station within preempted bursts that inform the mobile station that a burst is preempted) or may not be aware that certain bursts have been stolen. In the preferred embodiment, in the scenario that the mobile station is not aware that certain bursts have been stolen, the mobile station decodes supplemental information communicated which allows the mobile station to determine, or predict, that a burst has been preempted. In any case, means are provided to mitigate any degrading effects of the stolen bursts. Additional "soft" overload capacity is provided thereby eliminating a "hard" capacity ceiling which might cause excessive undesired mobile station blocking or call terminations in an actual cellular radio system implementation.

Figure 1:
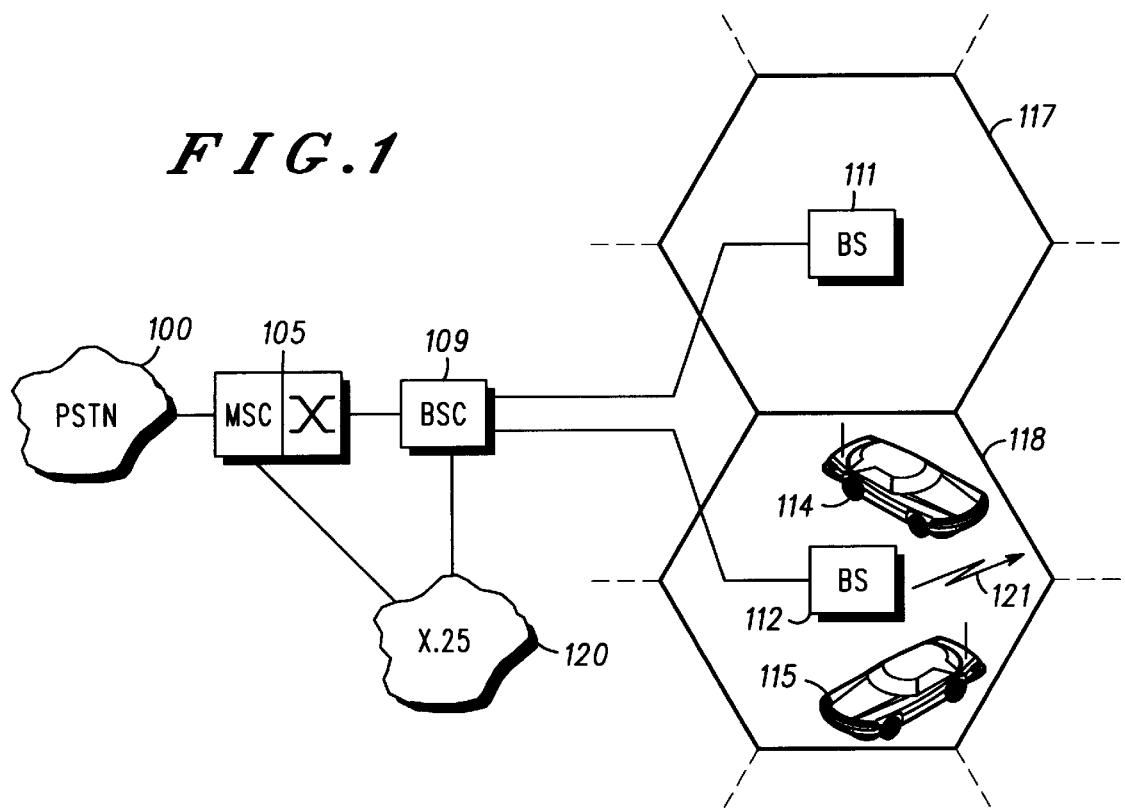
FIG. 1 generally depicts a frequency-hopping digital cellular system which may beneficially employ the present invention.

FIG. 1 generally depicts a frequency hopping digital cellular system which may beneficially employ the present invention. As depicted in FIG. 1, a mobile services switching center (MSC) 105 is coupled to a public switched telephone network (PSTN) 100. MSC 105 is also coupled to a base site controller (BSC 109) which performs switching functions similar to MSC 105, but at a location remote with respect to MSC 105. Coupled to BSC 109 are base-stations (BS, 111, 112), which in the preferred embodiment, are capable of communicating with a plurality of mobile stations the frequency-hopped burst frequencies. Communication from a BS, and for clarity purposes BS 112, occurs on a downlink of a radio channel 121 to mobile stations (MS, 114, 115). In the preferred embodiment, radio channel 121 may communicate with up to 8 MSs.

Figure 2:
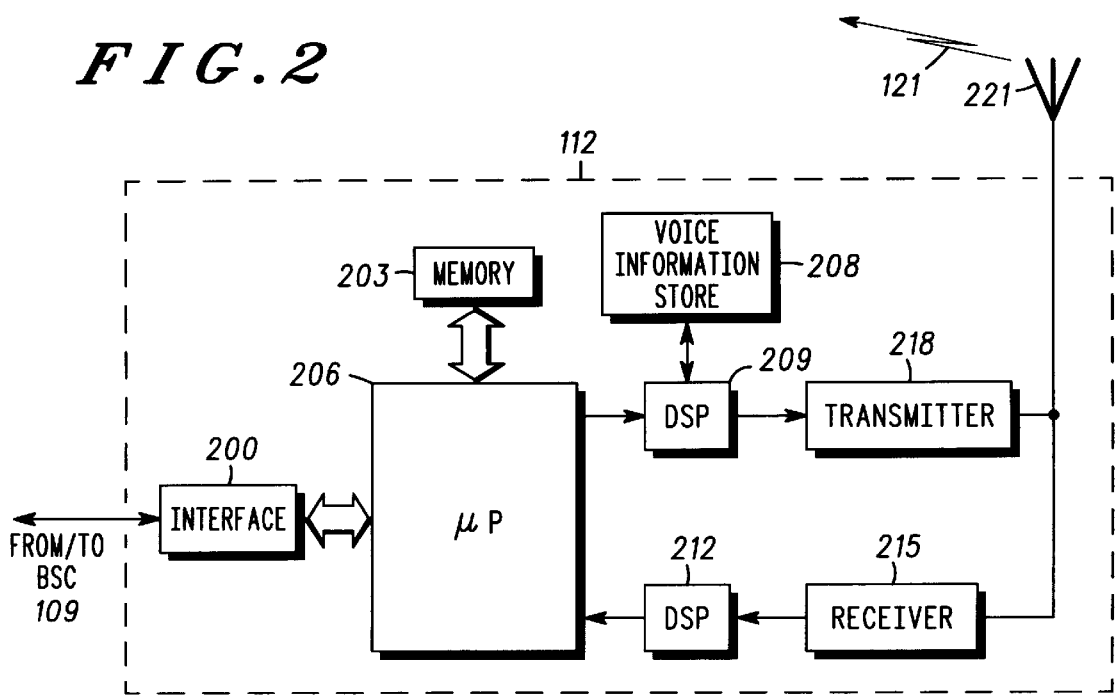
FIG. 2 generally depicts, in block diagram form, a radio which may beneficially employ the present invention.

FIG. 2 generally depicts a radio, and in this instance BS 112, which may beneficially employ the present invention. The block diagram depicted in FIG. 2 also applies to BS 111 in the preferred embodiment. Continuing, an interface 200, which in the preferred embodiment is a time division multiplexed (TDM) bus interface similar to the one described in U.S. Pat. No. 5,081,641, having as inventors Kotzin et al., and incorporated herein by reference. Interface 200 is coupled to means for assigning 206, which in the preferred embodiment is a Motorola microprocessor ($\mu$P). Coupled to $\mu$P 206 is memory block 203. Also coupled to $\mu$P 206 is means for preempting 209, which in the preferred embodiment is a Motorola 56000 digital signal processor (DSP) 209. Voice information store 208 is also coupled to DSP 209. Voice information store 208 stores criterion such as, inter alia, voice information, metrics related to voice, and estimates on the quality of burst frequencies to be transmitted. Voice information store 208 is coupled to DSP 209 such that preemption of burst frequencies assigned by microprocessor 206 may be based on the criterion stored in voice information store 208. Output from DSP 209 is input into a transmitter 218 which transmits radio channel 121 via a conventional antenna 221. In the preferred embodiment, radio channel 121 is a TDM/TDMA format.

At a single cell, for example cell 118, there is a full set of orthogonal frequency hopping sequences. However, overlaid (and therefore sharing these same frequencies) are additional information radio channels (not shown) which frequency hop using other predetermined optimized sequences to provide a uniform overlap across the other sequences. This allows fewer frequencies for hopping than there is MS information to be transmitted. This can be performed in several ways: (1) "steal", or preempt the burst frequencies, but make sure that it is done in a deterministic, controlled fashion across all the MSs; (2) preempt the burst frequencies but let the MSs know which ones they are so that an erasure can be done; and/or (3) let the MS alone figure out which burst frequencies have been preempted.

The preferred embodiment of the present invention is that of (1) above. The basic scheme uses what is called burst "stealing", or "preemption". In this technique, a deterministic algorithm preempts some of the bursts that would normally be transmitted for one MS and substitutes another's. As a simple example, consider a 5-frequency, frequency hopping system. A conventional system might have orthogonal hopping sequences allocated to 5 MSs as shown below. Pseudo random (i.e. not cyclic) frequency hopping allocation is shown.

TABLE 1

| Burst Frequencies (f = 1,2,3,4,5) Transmitted in Frames . . . ABCDEFGH . . . | |
| --- | --- |
| MS 114: | . . . 15323412 . . . |
| MS www: | . . . 52141253 . . . |
| MS xxx: | . . . 31452345 . . . |
| MS yyy: | . . . 24534121 . . . |
| MS zzz: | . . . 43215534 . . . |

MSs 114, www, xxx, yyy, and zzz represent a plurality of MSs, with MS 114 representing a first MS. MSs www, xxx, yyy, and zzz are not depicted in the drawings for clarity purposes. The logical representation of burst frequency assignment depicted in TABLE 1 is physically depicted in FIG. 3. Referring to FIG. 3, there is shown Frames A, B, and C having burst frequency (f) assignments corresponding to columns 1, 2, and 3 of TABLE 1 respectively. For example, the burst frequency (f) assignment depicted logically in column 2 of TABLE 1 (MS 114 where f=5, MS www where f=2, MS xxx where f=1, MS yyy where f=4, and MS zzz where f=3) is physically depicted in Frame B of FIG. 3, and represents the burst frequency assignment for Frame B. The slot assignment for each MS depicted in FIG. 3 is related to slot availability at the time of communication establishment, and is not critical to the present invention. As can be seen in FIG. 3, all 5 burst frequencies are in use all the time. A sixth user would be added in the following way. In each frame, certain burst frequency assignments from the first 5 MS are "preempted" to support communication between BS 112 and a second MS, for example MS 115. Thus, the first 5 users information would be transmitted as follows:

TABLE 2

| MS 114: | . . . x5323x12 . . . |
| --- | --- |
| MS www: | . . . 5x1412x3 . . . |
| MS xxx: | . . . 31x5234x . . . |
| MS yyy: | . . . 245x4121 . . . |
| MS zzz: | . . . 4321x534 . . . |

TABLE 2 is represented as shown in FIG. 4. As can be seen in FIG. 4, MS www's burst frequency assignment has been preempted (f=x, where x indicates no information for that MS is transmitted during that time period). In this simplified example, no other burst frequency assignment has been preempted during Frame B. MS www's burst frequency assignment can been preempted because through the use of redundancy coding and interleaving, it can be assumed that the system is moderately robust to the loss of the one out of 5 preempted burst frequencies. A sixth MS, MS115, can now be added as follows:

TABLE 3

| MS 115: | . . . 12435455 . . . |
| --- | --- |

FIG. 5 represents the combination of TABLE 2 with TABLE 3. FIG. 5 depicts the original 5 MSs, in addition to the newly added sixth MS. As can be seen, the sixth MS has been added without adding a sixth burst frequency. Of course, the example above is quite simplified. The fraction of bursts stolen is a function of the parameters used in the system design. Also, more powerful codes could allow more bursts to be stolen.

In a system design that incorporates this technique, there are some algorithms that could be utilized to maximize system performance. For example, hopping sequences could be defined that provide the desired "preemption" statistics. For example, such an algorithm or sequence would ensure that preempted bursts are uniformly distributed across all the radio channels at a particular cell.

Other algorithms could be employed to let the mobile station know when he should drop a burst so to not interfere with another user if a similar procedure is used for uplink. (it is believed that other techniques could eliminate the overlap problem on uplink. For example, there are several adaptive antenna and interference cancellation techniques that would allow simultaneous discrimination of the two independent bursts, particularly if there was some angle of arrival difference between the two mobile stations to the base. Multiple remote receivers could greatly aid in this discrimination process.

It is possible for the mobile station to know whether or not it is receiving a burst that has been preempted, and therefore incorrect information, such as to convey this information to the mobile station over an auxiliary channel. In GSM, for example, this is known as the SACCH channel. When this situation exists, the mobile station would know which bursts are the "wrong" bursts and would exclude them from consideration in the error correction coding process. Techniques for doing this are well known as erasure techniques. For example, in soft decision techniques, a zero would be assigned to the interfered-with-bits before they are presented to an error correction decoding apparatus, such as a soft error correction decoder.

Still more algorithms could ensure that a receiver knows when a burst that is not his is being received so that erasure information can be generated into the channel decoder.

There are several different techniques which could help decide which channel to transmit when a collision is going to occur, or what preemption is based on. The selection of the bursts for transmission could take into account metrics of voice activity, such as current voice activity detection for the multiple voices. For example, if voice activity is low or non-existent, this may be a good candidate to drop for a given burst. The point is, certain selections could be made with the intent of minimizing the impact to the recovered speech. Another possibility is for a determination to be made at the base which voice quality would suffer worst from being received in error and extrapolated. This could be done by at the expense of a slight amount of delay by assuming the frame is received for each voice in error and seeing which one's extrapolation algorithm does a better job of reproducing the speech using known perceptual weighting measures. This procedure allows the determination of which voice's information is best to send. Still another basis for preemption could be a statistic of voice information, such as the quality of the voice information. Finally, preemption could be based on an estimate of the the quality of the radio channel 121, such as bit error rate (BER) or signal strength indication (SSI).

Referring now to FIG. 2, FIG. 2 generally depicts a mobile station 114 or 115, absent interface 200. As shown in FIG. 2, radio channel 121 is received by receiver 215, which inputs the received radio channel into DSP 212 which determines whether a burst frequency assignment related to mobile station 114 has been preempted. The determination may be made by decoding supplemental information communicated to mobile station 114 which allows mobile station 114 to predict that a burst is preempted or by decoding marker information communicated to mobile station 114 within preempted bursts that inform mobile station 114 that a burst is preempted. Continuing, output from DSP 212 is input into μP 206 which compensates for the preempted burst assignment determined by DSP 212. Compensation for the preempted burst assignment may be performed by extrapolating speech information from information previously received and applying the extrapolated speech information in place of the preempted burst or by generating erasure information and applying the erasure information in place of the preempted burst. In the scenario where speech information is extrapolated, the extrapolated speech information is subsequently muted.

Still referring to FIG. 2, absent interface 200, there is depicted a mobile station 114 or 115 which may preempt burst frequency assignments related to the mobile station's uplink transmission in accordance with the invention. In GSM, mobile stations typically transmit information, such as valid voice information, on a periodic basis (i.e., one timeslot out of every frame), with no concession for the burst frequency assignment on a frame-to-frame basis to be preempted. GSM has provision for a feature called discontinuous transmission (DTX), but DTX only occurs when valid voice information is not present. When valid voice information is present, the mobile stations transmit the valid voice information once every frame. However, referring to FIG. 2 and in accordance with the invention, μP 206 determines whether a burst frequency assignment related to the mobile station's uplink transmission of information has been preempted. If valid voice information is to be transmitted, μP 206 determines that the typical transmission of a mobile station on a periodic basis is to be preempted. DSP 218 then interrupts the mobile station's uplink transmission of information when the mobile station's typical burst frequency assignment has been preempted. During the preempted burst (the preempted burst of valid voice information), mobile station 114 may transmit control information.

Thus, it will be apparent to one skilled in the art that there has been provided in accordance with the invention, an apparatus and method for preempting burst frequency assignments in a frequency-hopping communication system that fully satisfies the aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What I claim is:

1. A base-station in a frequency hopping communication system, the base-station capable of communicating with first and second mobile stations out of a plurality of mobile stations via frequency-hopped burst frequencies, the base-station comprising:

means for assigning said burst frequencies to support communication between said base-station and a plurality of mobile stations, said plurality of mobile stations including said first mobile station; and means, coupled to said means for assigning, for preempting certain of said burst frequency assignments between said base-station and said plurality of mobile stations to support communication between said base-station and said second mobile station, wherein the number of bursts preempted from the plurality of said mobile stations is substantially uniform.

2. A mobile station in a communication system, the mobile station communicating to a base-station via frequency-hopped burst frequencies, the mobile station comprising:

means for determining whether a burst frequency assignment related to said mobile station has been preempted; and means, coupled to said means for determining, for generating erasure information and applying said erasure information in place of said preempted burst.

3. A method of frequency hopping in a communication system, the communication system having a base station capable of communication with first and second mobile stations out of a plurality of mobile stations via frequency-hopped burst frequencies, the method comprising the steps of:

assigning said burst frequencies to support communication between said base-station and a plurality of mobile stations, said plurality of mobile stations including said first mobile station; and preempting certain burst frequency assignments between said base-station and said plurality of mobile stations to support communication between the base-station and said second mobile station, wherein the number of bursts preempted from the plurality of said mobile stations is substantially uniform.

* * * * *